United States Patent
Dickinson

[11] Patent Number: 5,909,209
[45] Date of Patent: Jun. 1, 1999

[54] COMBINATION MOUSE AND AREA IMAGER

[75] Inventor: Alexander George Dickinson, Neptune, N.J.

[73] Assignee: Lucent Technologies, Inc., Murray Hill, N.J.

[21] Appl. No.: 08/897,535

[22] Filed: Jul. 21, 1997

Related U.S. Application Data

[63] Continuation of application No. 08/579,531, Dec. 27, 1995, abandoned.

[51] Int. Cl.⁶ ....................................................... G09G 5/08
[52] U.S. Cl. ........................... 345/163; 345/166; 358/473
[58] Field of Search .................................. 345/156, 157, 345/158, 163, 164, 165, 166; 358/473, 474, 479, 497, 906, 909.1; 235/472, 473; 437/54; 382/313

[56] References Cited

U.S. PATENT DOCUMENTS

| | | | |
|---|---|---|---|
| 4,642,877 | 2/1987 | Garner et al. | 437/54 |
| 4,797,544 | 1/1989 | Montgomery et al. | 358/473 |
| 4,804,949 | 2/1989 | Faulkerson | 345/166 |
| 4,837,635 | 6/1989 | Santos | 358/451 |
| 4,906,843 | 3/1990 | Jones et al. | 250/221 |
| 5,023,922 | 6/1991 | Abramovitz et al. | 358/497 |
| 5,051,838 | 9/1991 | Cho et al. | 358/401 |
| 5,194,729 | 3/1993 | Okisu et al. | 358/453 |
| 5,216,233 | 6/1993 | Main et al. | 235/472 |
| 5,291,009 | 3/1994 | Roustaei | 235/472 |
| 5,355,146 | 10/1994 | Chiu et al. | 345/156 |
| 5,369,262 | 11/1994 | Dvorkis et al. | 235/472 |
| 5,510,607 | 4/1996 | Ishikawa | 235/472 |
| 5,574,804 | 11/1996 | Olschafskie et al. | 382/313 |
| 5,585,926 | 12/1996 | Fujii et al. | 358/471 |

*Primary Examiner*—Steven J. Saras
*Assistant Examiner*—David L Lewis

[57] ABSTRACT

A hand-held device such as a mouse is provided for inputting into a computer relative positional information during movement of the device over a generally planar surface and for inputting an optical image of an object located thereunder. The device includes a housing adapted to be grasped by a user and moved along the surface. A positional transducer is mounted in the housing for generating first signals representative of the amount of movement of the device over the surface. An area imager is located within the housing for recording an image of an object and for generating second signals representative of the image.

16 Claims, 2 Drawing Sheets

COMBINATION MOUSE AND AREA IMAGER

This is a Continuation of application Ser. No. 08/579,531 filed Dec. 27, 1995, now abandoned.

TECHNICAL FIELD

The present invention relates generally to a hand-held pointing device such as a mouse and more particularly to a hand-held pointing device that includes an area imager.

BACKGROUND OF THE INVENTION

Current personal computers typically include a mouse, which is a device that is manually rolled across a surface to position a cursor on the computer screen. A mouse pointing device typically incorporates a track ball or other surface engaging mechanism which rotate disk encoders to generate positional data. Mouse devices also include push-buttons which may be actuated by the operator's fingers to facilitate such actions as menu selection and the dragging of images across the screen.

Mouse devices are known that incorporate an optical scanner so that images may be captured from a document and transferred to the computer by manually sliding the scanner across the document. U.S. Pat. No. 5,355,146, for example, discloses a mouse device that incorporates a linear image sensor such as a CCD. When used as a scanner, the device is dragged across a document and the image data captured in this manner is fed to software stored in the computer. The device may be freely dragged back and forth across the document several times and the software, responding to the continuously-monitored position of the device, continuously writes the scanned image data into the appropriate place within a random access memory. One limitation of this device is that it requires complex software to properly correlate the image data with the positional data.

SUMMARY OF THE INVENTION

The present invention provides a hand-held device for inputting into a computer relative positional information during movement of the device over a generally planar surface and for inputting an optical image of an object located thereunder. The device includes a housing adapted to be grasped by a user and moved along the surface. A positional transducer is mounted in the housing for generating first signals representative of the amount of movement of the device over the surface. An area imager is located within the housing for recording an image of an object and for generating second signals representative of the image. Because the present invention employs an area imager rather than an optical scanner, the user can quickly obtain an image in a single step and software for correlating image data with positional data is not required.

DETAILED DESCRIPTION

Figure 1:
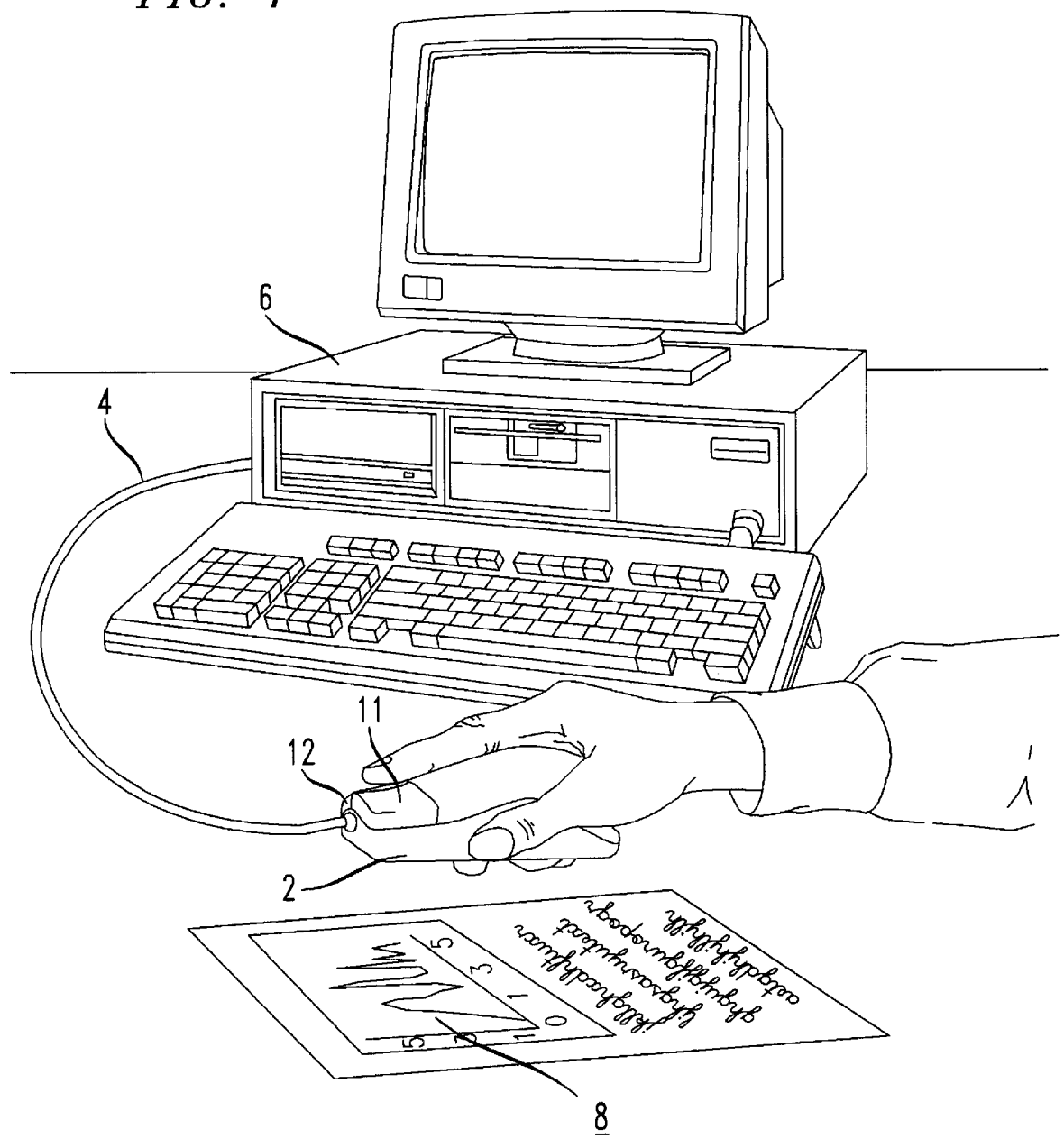
FIG. 1 shows a perspective view of a mouse pointing device constructed in accordance with the present invention which is positioned to image a document.

FIG. 1 shows one embodiment of a device 2 constructed in accordance with the present invention that functions as a mouse pointing device and an imager. The device 2 is connected by a cable 4 to a computer 6 having a keyboard and a display. The device 2 is shown in a position to image a document 8 located therebelow. By pressing a button located on the device the document is recorded by an area imager (not shown in FIG. 1). The image may be transmitted by the cable 4 to the computer 6 so that text characters are input into the computer in a form such as ASCII when text is recorded or graphic information is input when other types of images are recorded. The device 2 also may operate as a mouse by placing it on the desktop or other surface and operating it in a conventional manner with buttons 11 and 12.

Figure 2:
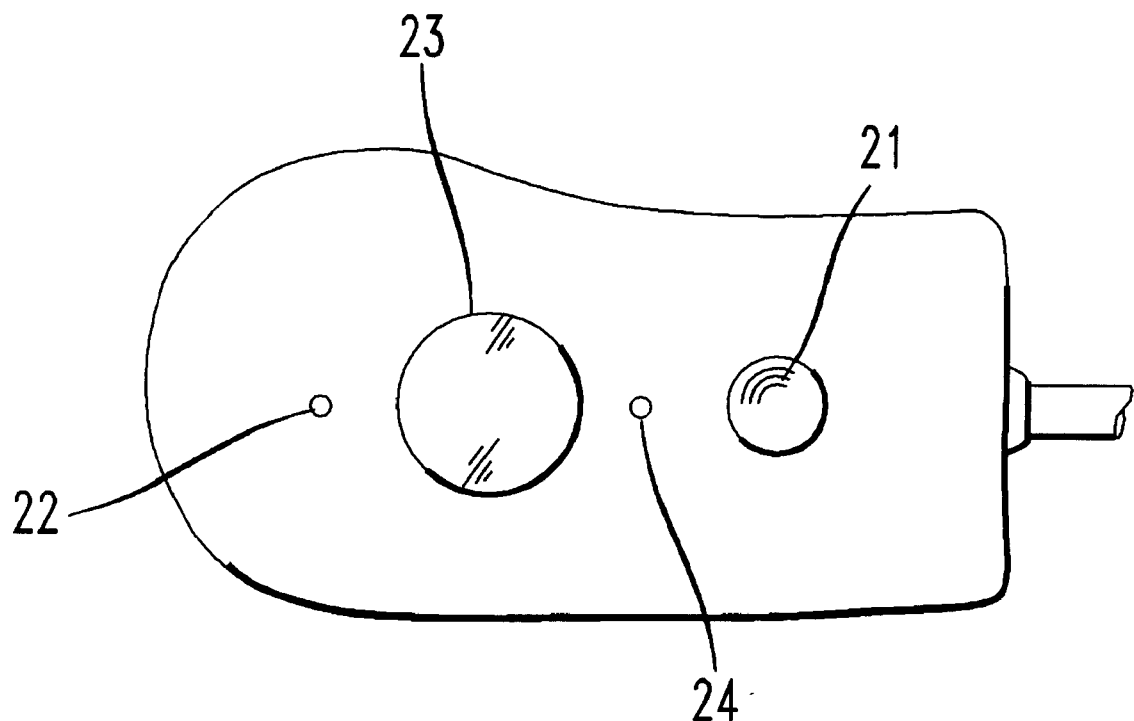
FIG. 2 shows the bottom of the mouse pointing device shown in FIG. 1.

FIG. 2 shows the bottom of the device 2 in more detail. A position transducer includes a mouse track ball 21 which transmits to the computer the amount and direction of manually directed movement of the device 2 over a surface in contact with the transducer 21. The track ball 21 can be replaced by a variety of suitable elements, including, for example, a pair of orthogonal wheels. The position transducer operates as in a conventional mouse and hence will not be discussed in greater detail.

Figure 3:
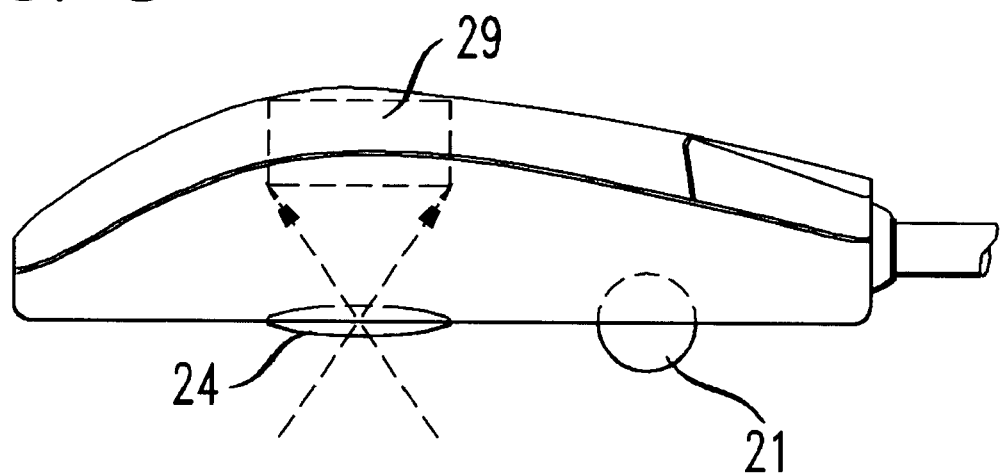
FIG. 3 is a cross-sectional view of the mouse pointing device showing the optical path traversed by the light from the document to an area imager.

An opening 23 is located on the bottom of the device 2 through which an image of the document is recorded. As seen in FIG. 3, an image of the document enters the device through the opening and is focused by a lens 24 upon an area imager 29. An area imager consists of a plurality of rows and columns of light sensitive elements. The area imager 29 may be any type of suitable device such as a charge coupled device (CCD) sensor or a CMOS imager, for example. Examples of such area imagers are disclosed in, Fossum, E.R. "Active Pixel Sensors: Are CCD's Dinosaurs?" Proceedings of SPIE: Charge-Coupled Devices and Solid State Optical Sensors III, Vol. 1900, pp. 2–14 (1993), for example.

Referring again to FIG. 2, an illuminator 22 such as an LED, LED array or a flash lamp may be located underneath the mouse to adequately illuminate the document for recording. The use of an illuminator may be advantageous because it allows a less sensitive and hence less expensive area imager to be used. Suitable drive electronics for the area imager, as well as amplifying circuitry may be provided in the form of integrated circuits mounted to a printed circuit board located within the device. 2. Alternatively, the area imager may comprise a single chip that incorporates both the light sensitive elements and the requisite electronics.

FIG. 2 also shows an optional alignment apparatus 24 that is used to properly orient the device 2 over the document when recording an image. The alignment device may, for example, illuminate the document with alignment markers prior to recording the image. The alignment markers indicate the area under the device that will be recorded by the area imager. The alignment apparatus may be combined with the illuminator 22. Alternatively, alignment may be achieved by transmitting a low resolution image to the computer in real time so that by observing the image on the computer screen the user can properly locate the document under the device 2.

The output signals from the area imager 29 are transferred to the computer via the cable 4. Therefore, the output signals from the device can be used by the computer to reconstruct the characters, graphic or other information recorded by the device 2 in a conventional manner.

In contrast to a mouse incorporating a linear scanner such as disclosed in the previously mentioned patent, the device of the present invention can record an image of the document in a single step and does not need to repeatedly scan over the document. Moreover, also in contrast to the previously mentioned patent, the inventive device does not require complex software to properly correlate positional data with captured image data to ensure that the data is stored in the proper location within the random access memory of the computer.

The resolution required of the area imager will depend on the size of the document to be recorded and the image quality that is desired. For example, if the device 2 is to image conventional 8½×11 inch documents at a resolution of about 200 dpi×100 dpi, which is comparable to the resolution of a facsimile, the area imager will require an array of about 1700×1100 light sensitive elements. If, alternatively, the device 2 is limited to imaging documents comparable in size to a business card, the area imager only requires an array of about 800×200 light sensitive elements.

I claim:

1. A hand-held device for inputting into a computer relative positional information during movement of the device over a generally planar surface and for inputting an optical image of an object located thereunder in a single step, said device comprising:

a housing adapted to be grasped by a user and moved along the surface;

a positional transducer mounted in said housing for generating first signals representative of an amount of movement of the device on the surface; and an area imager of a predetermined size located within said housing for recording an image of an object in a single scanning step when said housing is positioned above the surface and for generating second signals representative of said image said device outputting the second signals without correlating the amount of movement represented by the first signals to the image represented by the second signals.

2. The device of claim 1 wherein said positional transducer includes a track ball.

3. The device of claim 1 further comprising at least one finger-actuated input device that directs action on a computer screen.

4. The device of claim 1 further comprising a finger-actuated input device that actuates said area imager.

5. The device of claim 4 wherein said area imager is a charge coupled device.

6. The device of claim 4 wherein said area imager is CMOS imager.

7. The device of claim 1 further comprising an illuminator that illuminates the document for imaging.

8. The device of claim 7 wherein said illuminator is an LED located on an underside of said housing.

9. The device of claim 1 further comprising an optical alignment device that orients the document within an image field of said area imager.

10. The device of claim 9 wherein said optical alignment device projects illumination markers denoting said image field.

11. The device of claim 1, wherein said area imager is capable of recording a business-card size image in a single scanning step.

12. The device of claim 1, wherein said area imager is capable of recording a 8.5×11 inch document in a single scanning step.

13. A hand-held device for inputting into a computer relative positional information during movement of the device over a generally planar surface and for inputting an optical image of an object located thereunder in a single step said device comprising:

a housing adapted to be grasped by a user and moved along the surface;

a positional transducer mounted in said housing for generating first signals representative of an amount of movement of the device on the surface;

an area imager of a predetermined size located within said housing for recording an image of an object in a single scanning step when said housing is positioned above the surface and for generating second signals representative of said image, said device outputting the second signals without correlating the amount of movement represented by the first signals to the image represented by the second signals; and an optical alignment device located on a bottom side of said housing that emits light to allow a user to manually position the hand-held device, including the area imager, relative to a desired image on the surface.

14. The device of claim 13, wherein said optical alignment device projects illumination markers denoting said image field.

15. A hand-held device for inputting into a computer relative positional information during movement of the device over a generally planar surface and for inputting an optical image of an object located thereunder, said device comprising:

a housing adapted to be grasped by a user and moved along the surface;

a positional transducer mounted in said housing for generating first signals representative of an amount of movement of the device on the surface;

an area imager of a predetermined size located within said housing for recording an image of an object in a single scanning step when said housing is positioned above the surface, and for generating second signals representative of said image, said device outputting the second signals without correlating the amount of movement represented by the first signals to the image represented by the second signals; and an optical alignment device for orienting the area imager relative to the image on the surface, said alignment device including a real-time transmitter that transmits a low resolution image to the computer in real-time so that the size and contents of the image to be recorded can be observed in real-time on a computer screen to aid in alignment of the area imager and image selection.

16. The hand-held device of claim 1 further comprising an optical alignment device including means for manual hand-held alignment of the area imager relative to the image of an object to be scanned.

\* \* \* \* \*